United States Patent Office 3,418,251
Patented Dec. 24, 1968

3,418,251
GELS OF ORGANIC COMPOUNDS OF ZIRCONIUM AND PROCESS FOR FORMING SAME
James Albert Stynes, Lewiston, N.Y., assignor to National Lead Company, New York, N.Y., a corporation of New Jersey
No Drawing. Original application Dec. 31, 1963, Ser. No. 334,928, now Patent No. 3,350,432, dated Oct. 31, 1967. Divided and this application Feb. 23, 1967, Ser. No. 635,278
12 Claims. (Cl. 252—316)

ABSTRACT OF THE DISCLOSURE

Gels are formed with many liquids by mixing therewith a small amount of a glyceratozirconium halide, i.e. $[Zr(OH)_x(C_3H_6O_3)_yA_z]_n$ where A is a halogen selected from the group consisting of chlorine, bromine, and iodine; $y$ is a number in the range 0.8–8.0; $z$ is a number in the range 0.9–1.15; $x$ is a number equivalent to $4-(2y+z)$; and $n$ is a variable number greater than 1; in aqueous solution.

This application is a division of Ser. No. 334,928, filed Dec. 31, 1963, and now U.S. Patent No. 3,350,432.

This invention relates to organic compounds of zirconium and is particularly concerned with polymeric compounds of zirconium with halogens and glycerol.

Although it has hitherto been known that zirconium and glycerol would combine in alkaline solution to form a water-insoluble, basic zirconium glycerate, no water-soluble compound of zirconium with a halogen and glycerol has previously been described.

It has been found that polymeric, water-soluble compounds with unusual properties are obtained when aqueous solutions of certain zirconyl halides are heated with glycerol. Analysis of these products has shown that the formula thereof may be written:

$$[Zr(OH)_x(C_3H_6O_3)_yA_z]_n$$

where A is a halogen selected from the group consisting of chlorine, bromine, and iodine; $y$ is a number in the range 0.8–1.0; $z$ is a number in the range 0.9–1.15; $x$ is a number equivalent to $4-(2y+z)$; and $n$ is a variable number greater than 1. It will be understood, however, that it is not intended to suggest by this essentially empirical formula any particular molecular structure as there are insufficient data available to permit the drawing of any definite conclusions as to such structure. The products of the present invention corresponding to the formula set forth above may be referred to as glyceratozirconium halides.

The novel materials of the invention which are comprehended by the formula set forth above have (a) unique rheological properties in aqueous solution which permit (1) the forming of highly viscous solutions that may be dried to form films and (2) the forming of gels with many liquids, (b) characteristic X-ray diffraction patterns, and (c) characteristic infrared absorption patterns. In the following example the production of a product according to the invention is illustrated.

Example 1

A solution of $ZrOCl_2$ in water was prepared and diluted to make the solution 1.5 molar. To this solution was added glycerol in the proportion of 1.5 moles per gram atom of zirconium. The mixture was stirred while heating it to boiling temperature and was then refluxed for 21 hours. A precipitate was formed which was filtered off and washed with acetone. The precipitate was dried over $P_2O_5$ and gave an analysis of $ZrO_2$–51.01%, Cl–15.44%, glycerol–35.20%. This is equivalent to a Cl/Zr atomic ratio of 1.06 and a corresponding glycerol/Zr ratio of 0.93. The yield was 66% on a zirconium basis.

The glyceratozirconium chloride of Example 1 when dried at 50° C. was found to be a very efficient gelling agent. When 0.5 g. of product was dissolved in 1.5 ml. of water and 25 ml. of methyl alcohol was added, a firm, clear gel formed in 25 minutes.

Example 2

A number of experiments, similar to that set forth in Example 1, were performed. In these experiments the concentrations of the zirconyl chloride and the glycerol were varied and the relative proportions of these reactants were varied. It was found that a minmum of about 1 mole of glycerol per gram atom of zirconium in the solution to be refluxed is necessary if a reasonable yield is to be obtained in less than about 20 hours and an excess of glycerol was found to improve the yield. It was also found that to obtain a precipitate in less than about 20 hours, the solution of zirconyl chloride used should have a molarity greater than 1.0 and preferably of 1.5 or more. It should be noted that glycerol is completely miscible with water so that very concentrated solutions can be formed, while at room temperatures solutions of zirconyl chloride are substantially saturated at a concentration of about 3 molar.

In the following example another procedure for obtaining a product according to the invention is illustrated.

Example 3

A 2.4 molar $ZrOCl_2$ solution was prepared and to this glycerol was added in the proportion of 1 mole of glycerol per gram atom of zirconium. After mixing, the solution was placed in a pressure vessel which was closed and the contents were heated to 145° C. for four hours. A water-soluble precipitate was formed which was found to have an X-ray diffraction pattern exhibiting the same characteristics as that of the product of Example 1. This precipitate when analyzed showed a Cl/Zr atomic ratio of 1.05 and a corresponding glycerol/Zr ratio of 0.89. When 0.5 g. of this precipitate was dissolved in 3 ml. of water and mixed with 25 ml. of methanol, a firm gel formed in four minutes.

In the examples set forth above, the products have been derived from zirconyl chloride and may be called glyceratozirconium chlorides. It has also been found as set forth in the following three examples that similar products, which may be called glyceratozirconium bromides can be derived from zirconyl bromide.

Examples 4–5

A 1.5 molar $ZrOBr_2$ solution was mixed with 1 mole of glycerol per gram atom of Zr and refluxed for 20 hours. A gelatinous, water-soluble precipitate was recovered. A rigid, clear gel was formed when this precipitate was dissolved in a small amount of water and mixed with methanol.

The procedure set forth above was repeated using 2 moles of glycerol per gram atom of zirconium and essentially the same results were obtained.

Example 6

A 2.5 molar $ZrOBr_2$ solution was mixed with 1.5 moles of glycerol per gram atom of zirconium and heated in a pressure vessel for four hours at 150° C. A water soluble precipitate was obtained, an aqueous solution of which formed a gel with methanol.

The glyceratozirconium bromides formed by the procedure of Examples 4–6 are characterized by Br/Zr and glycerol/Zr ratios of approximately 1. They are, therefore, comprehended by the formula set forth above and are useful for the same purposes as the glyceratozirconium chloride discussed above.

Glyceratozirconium iodides having properties and uses similar to those of the chlorides and bromides and corresponding to the empirical formula given above have also been obtained. For example, a glyceratozirconium iodide according to the invention may be prepared in accordance with the procedure set forth in Example 1.

Example 7

Using the procedure of Example 1 but employing a 1.5 molar $ZrOI_2$ solution and refluxing for 25–30 hours, a gelatinous, water-soluble precipitate in obtained. When the precipitate is dissolved in water and mixed with ethanol or methanol a clear gel is formed.

As indicated, the novel glyceratozirconium halides of the present invention in aqueous solution readily form gels with methanol. In fact, as mentioned above, the ability to form gels with many different liquids is a characteristic of such products. In forming such gels, an aqueous solution of a glyceratozirconium halide is mixed with the liquid which must contain at least one component that is miscible to a substantial extent with water. If the glyceratozirconium halide is insoluble in the resulting liquid mixture, it appears to form a three-dimensional network in the mixed liquids, thereby producing a gel. Such a network may also result from the reaction of the glyceratozirconium halide with a component of the liquid to form a product that is insoluble in the liquid mixture. The following examples illustrate gel formation in various liquid media using glyceratozirconium chlorides, which are the most easily and inexpensively prepared of the materials covered by the present application.

Example 8

One gram of glyceratozirconium chloride was dissolved in 3 ml. of water and mixed with 200 ml. of 150 proof rum. A clear rigid gel formed in 2 hours.

Example 9

One gram of glyceratozirconium chloride was dissolved in 24 ml. of water and mixed with 50 ml. of 1-propanol. A rigid gel was formed in 10 minutes.

Example 10

One gram of glyceratozirconium chloride was dissolved in 24 ml. of water and mixed with 30 ml. of acetone. A gel was formed within 1.5 hours.

Example 11

One gram of glyceratozirconium chloride was dissolved in 24 ml. of water and mixed with 30 ml. of 1,4-dioxane. A gel was formed within 2 hours.

Example 12

One gram of glyceratozirconium chloride was dissolved in 20 ml. of water and mixed with 50 ml. of allyl alcohol. A gel was formed within 45 minutes.

Example 13

One gram of glyceratozirconium chloride was dissolved in 5 ml. of water and mixed with 75 ml. of methanol. Immediately thereafter there was mixed in 20 ml. of benzene. The mixture set to a rigid gel in 5 minutes.

A similar result was obtained when diethyl ether or carbon tetrachloride was used instead of benzene.

Example 14

One gram of glyceratozirconium chloride was dissolved in 80 ml. of water and mixed with a solution of 1 gram of tartaric acid in 20 ml. of water. A clear, rigid gel formed substantially at once.

Example 15

One-half a gram of glyceratozirconium chloride was dissolved in 40 ml. of water and mixed with 10 ml. of a 0.5% (wt.) solution of sodium sulfate in water. The viscosity of the mixture increased steadily and after 5 days a gel was formed.

In Examples 8–13, inclusive, it appears that the gel formation results from insolubility of the glyceratozirconium chloride in the liquid mixture. It may be noted that in Example 13 methanol was added to impart miscibility to the benzene and water. In the last two examples, 14 and 15, the gel formation is believed to result from the insolubility of reaction products in the liquid mixtures.

The amount of glyceratozirconium halide needed for forming gels may vary, as seen in the foregoing examples, in the range from about 0.5% to about 2% of the mixture forming the gel. In extensive experiments it has been found that in general a minimum of about 0.3% of the glyceratozirconium halide in the mixture is required for gelling. Greater amounts may be used to increase the rapidity of gelling and/or the rigidity of the gel formed. It has been found that in many cases superior gels may be formed when a more complex gelling procedure is used. Thus, for example, a firmer gel may be secured when using a minimum of glyceratozirconium halide with an excess of methanol if a very minute amount of an aqueous tartaric acid solution is added to the mixture.

It has also been discovered that the glyceratozirconium chlorides of the present invention can be used, as shown by the following example, to prepare clear, transparent, flexible films. As noted above, the aqueous solutions of glyceratozirconium chloride are quite viscous. They become much more viscous with aging. This characteristic is utilized in forming films.

Example 16

Thirty grams of glyceratozirconium chloride was dissolved in 500 ml. of water and allowed to stand until the viscosity was 56,000 cps. (Brookfield, 6 r.p.m., Spindle No. 4). To this was added 11 g. of glycerol, as a plasticizer, which was thoroughly stirred in. The mixture was then cast on a paraffin coated glass plate. On drying, a colorless, transparent film about 1 mm. thick was formed. Upon removal from the plate, the film was found to be quite flexible and stable when exposed to air for a protracted period.

Attempts have been made to react zirconyl halides with other polyhydroxy compounds to produce water-soluble reaction products having properties similar to those of glyceratozirconium halides. Such attempts have not met with much success. In a few cases, however, favorable results were obtained. Of particular interest are the gel-forming, water-soluble reaction products obtained with inositol, mannitol, and sorbitol. The preparation of the first mentioned product is illustrated in the following example.

Example 17

A 1.5 molar $ZrOCl_2$ solution was mixed inositol in proportions to give 1 mole of inositol per gram atom of zirconium and refluxed for 20 hours. A white precipitate was formed which dissolved in water to give a slightly hazy solution. A solution of ½ g. of the product in 3 ml. of water caused gelling when mixed with 25 ml. of methanol.

The water soluble precipitates obtained by the reaction of zirconyl halide solutions with polyhydroxy compounds are rather highly hydrated. For example, glyceratozirconium chlorides even after drying at room temperature may contain about 9% or more water. It will be understood that in the appended claims it is meant to include both the hydrated and unhydrated forms of the claimed reaction products.

Glyceratozirconium halides have been found to have characteristic infra-red absorption patterns as well as characteristic X-ray diffraction patterns. Glyceratozirconium chloride, for example, has an infra-red pattern which shows a strong absorption band at $12.34\mu$ and an X-ray diffraction pattern characterized by the following peaks on the graph obtained with a recording X-ray diffractometer:

Table A

| d | $I/I_o$ |
|---|---|
| 12.44 | 72 |
| 10.64 | 100 |
| 8.11 | 32 |
| 6.19 | 13 |
| 5.30 | 23 |
| 4.09 | 69 |
| 3.81 | 44 |
| 3.36 | 11 |
| 3.20 | 16 |
| 3.11 | 16 |
| 2.95 | 11 |
| 2.85 | 8 |

It will be clear from the foregoing description of the invention that the invention provides not only novel and useful zirconium compounds, but also a means for making a variety of novel and useful gels and other products.

The gels formed by glyceratozirconium halides may be employed for a number of purposes as shown by the following examples.

Example 18

A firm gel, such as the one resulting from mixing 1 gram of glyceratozirconium chloride dissolved in 3 ml. of water with 200 ml. of alcohol, was cut into blocks which were found to be easily handled solid fuel. The alcohol in the gel burned freely with a hot flame and the block of gel retained its shape during burning although it gradually diminished in size. Such fuel blocks may be easily and conveniently packaged in plastic bags.

Example 19

A firm gel like the gel of Example 8 was found to be divisible into bite-sized portions which could be packaged in a plastic bag and remain available for refreshment when desired without the need for a sealed, liquid-proof container.

Example 20

A firm gel, such as the gel of Example 14, is conveniently employed as a packing and cushioning body for fragile articles. In such use, the fragile articles, such as china figurines, are placed at spaced intervals in a suitable container. When the glyceratozirconium halide solution is mixed with the tartaric acid solution, the mixture is immediately poured into the container. The gel which promptly forms provides excellent protection to the fragile articles against breakage by shock.

Except where otherwise indicated, parts and percentages set forth in the present specification and claims are parts and percentages by weight.

What is claimed is:

1. A process for forming a gel which comprises:
  (a) forming a dilute aqueous solution of a glyceratozirconium halide selected from the group consisting of glyceratozirconium chloride, glyceratozirconium bromide, and glyceratozirconium iodide; and
  (b) adding said solution to a liquid medium, said medium having a portion which is substantially miscible with water and capable of forming with said solution a liquid mixture in which a composition selected from the group consisting of said glyceratorzirconium halides and the reaction products thereof with at least one component of said liquid medium is substantially insoluble, in a small amount but effective to cause gelling of the mixture.

2. A process as set forth in claim 1 in which the liquid medium is completely miscible with water.

3. A process as set forth in claim 2 in which the liquid medium is a water miscible alcohol.

4. A process as set forth in claim 2 in which the liquid medium is a dilute solution of tartaric acid.

5. A process as set forth in claim 2 in which the liquid medium is a dilute solution of a soluble sulfate.

6. A process as set forth in claim 1 in which the liquid medium is only partially miscible with water.

7. A gel consisting essentially of:
  (a) water;
  (b) a glyceratozirconium halide selected from the group consisting of glyceratozirconium chloride, glyceratozirconium bromide, and glyceratozirconium iodide; and
  (c) a liquid medium, at least a portion of which is substantially miscible with water, which forms with water a liquid mixture in which a composition selected from the group consisting of said glyceratozirconium halides and the reaction products thereof with at least one component of said medium is substantially insoluble;
  said glyceratozirconium halide being present in an amount of at least 0.3% of said gel.

8. A gel as set forth in claim 7 in which said glyceratozirconium halide is glyceratozirconium chloride.

9. A gel as set forth in claim 7 in which said glyceratozirconium halide is glyceratozirconium bromide.

10. A gel as set forth in claim 7 in which said glyceratozirconium halide is glyceratozirconium iodide.

11. A gel consisting essentially of a water miscible alcohol, water, and a glyceratozirconium chloride in an amount sufficient to produce said gel.

12. A gel consisting essentially about 1% of tartaric acid, water, and a glyceratozirconium chloride in an amount sufficient to produce said gel.

References Cited

UNITED STATES PATENTS

| 1,993,289 | 3/1935 | Stokes et al. | 252—316 |
| 2,046,101 | 6/1936 | York | 252—316 |
| 3,291,579 | 12/1966 | Mulaskey | 44—7 |

HERBERT B. GUYNN, *Primary Examiner.*

R. D. LOVERING, *Assistant Examiner.*

U.S. Cl. X.R.

44—7; 99—30, 34